United States Patent
Mao et al.

(10) Patent No.: US 6,411,478 B1
(45) Date of Patent: Jun. 25, 2002

(54) SPIN TUNNEL JUNCTION RECORDING HEADS USING AN EDGE JUNCTION STRUCTURE WITH CIP

(75) Inventors: Sining Mao, Savage; Dian Song, Eden Prairie, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/500,152

(22) Filed: Feb. 8, 2000

Related U.S. Application Data

(60) Provisional application No. 60/119,773, filed on Feb. 11, 1999.

(51) Int. Cl.$^7$ .................................................. G11B 5/39
(52) U.S. Cl. ........................................................... 360/324.2
(58) Field of Search ........................ 360/324.2, 324.12; 338/32 R; 324/207.21, 252; 29/603.07, 603.14; 428/692, 693; 365/171, 173

(56) References Cited

U.S. PATENT DOCUMENTS

| 5,640,343 A | 6/1997 | Gallagher et al. ........... 365/171 |
| 5,650,958 A | 7/1997 | Gallagher et al. ........... 365/173 |
| 5,729,410 A | 3/1998 | Fontana, Jr. et al. ......... 360/113 |
| 5,764,567 A | 6/1998 | Parkin ........................ 365/173 |
| 5,793,697 A | 8/1998 | Scheuerlein ........... 365/230.07 |
| 5,801,984 A | 9/1998 | Parkin ........................ 365/158 |
| 5,835,314 A | * 11/1998 | Moodera er al. ........... 360/113 |
| 5,841,692 A | 11/1998 | Gallagher et al. ........... 365/173 |
| 5,862,022 A | 1/1999 | Noguchi et al. ............. 360/113 |
| 5,898,547 A | 4/1999 | Fontana, Jr. et al. ......... 360/113 |
| 5,898,548 A | 4/1999 | Dill et al. ................... 360/113 |
| 5,901,018 A | 5/1999 | Fontana, Jr. et al. ......... 360/104 |

FOREIGN PATENT DOCUMENTS

| JP | 10-107337 | 4/1998 | |
| JP | 10-255231 | 9/1998 | |
| WO | WO 95/10123 | 4/1995 | |
| WO | WO 97/39488 | * 10/1997 | ........... H01L/43/08 |
| WO | WO 99/22368 | 5/1999 | |

* cited by examiner

Primary Examiner—William Klimowicz
(74) Attorney, Agent, or Firm—Westman, Champlin & Kelly P.A.

(57) ABSTRACT

A spin tunnel junction magnetoresistive head in accordance with the invention includes a pinned ferromagnetic layer, a free ferromagnetic layer and a spin tunnel barrier material positioned relative to the pinned and free ferromagnetic layers such that current flowing through the free ferromagnetic layer is in the plane of the free ferromagnetic layer. The spin tunnel barrier material forms first and second edge junctions. Using the edge junctions, the free ferromagnetic material, the pinned ferromagnetic and the edge junctions can all be formed at least partially in plane with each other, reducing shield-to-shield spacing for the head.

19 Claims, 8 Drawing Sheets

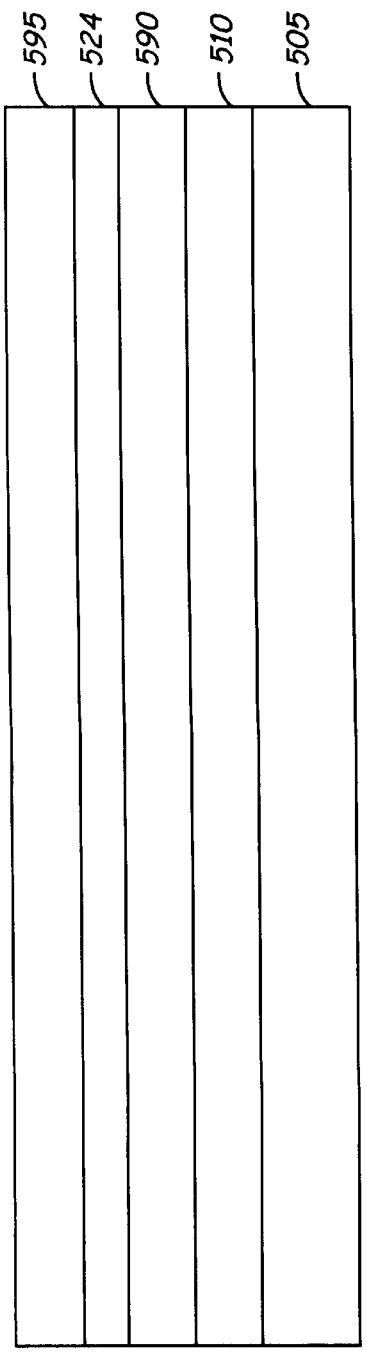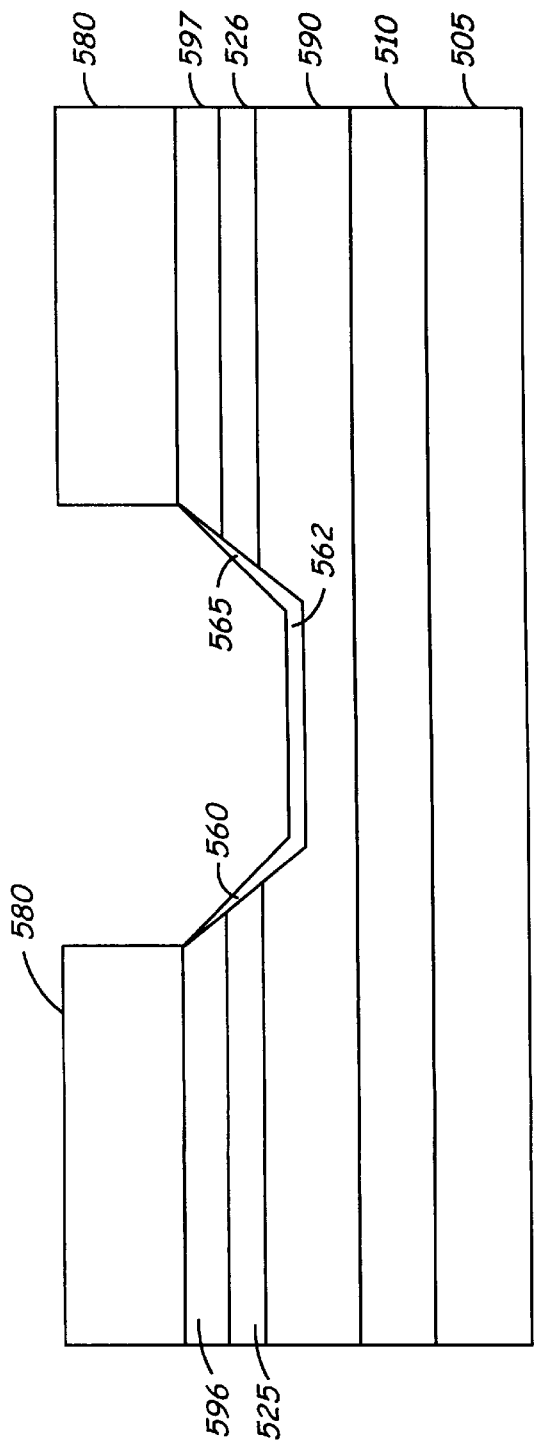

SPIN TUNNEL JUNCTION RECORDING HEADS USING AN EDGE JUNCTION STRUCTURE WITH CIP

The present invention claims priority to Provisional application Ser. No. 60/119,773, filed Feb. 11, 1999 and entitled SPIN TUNNEL JUNCTION RECORDING HEADS USING AN EDGE JUNCTION STRUCTURE.

BACKGROUND OF THE INVENTION

The present invention relates to data storage systems. More specifically, the present invention relates to data storage systems using spin tunnel magnetoresistive read heads.

A magnetoresistive (MR) element exhibits a change in electrical resistance as a function of external magnetic field. This property allows MR elements to be used as magnetic field sensors, read heads in magnetic storage systems, and magnetic random-access-memories. In storage systems, the read head is typically merged with a writer head. The writer writes encoded information to the magnetic storage medium, which is usually a disk coated with hard magnetic films. In a read mode, a magnetic bit on the disk modulates the resistance of the MR element as the bit passes below the read head. The change in resistance can be detected by passing a sensing current through the MR element and measuring the voltage across the MR element. The resultant signal can be used to recover data from the magnetic storage medium. Depending on the structure of a device, the MR effect can fall in to different categories, namely, anisotropic MR (AIMR), giant MR (GMR), tunneling MR (TMR), and colossal MR (CMR).

Many hard disc read heads currently in production utilize an AMR sensor. The essential structure consists of a stripe of soft magnetic material, usually an alloy of Ni, Fe and/or Co. For areal densities beyond about 10 Gbit/inch$^2$, AMR heads give way to GMR heads due to lack of signal.

The GMR device favored by the data storage industry is the spin valve. It consists of a free ferromagnetic layer which rotates with the external field, a conductive spacer, and a pinned ferromagnetic layer which has a magnetization fixed along one direction. The electrical resistance of a spin valve is a function of the angle between the magnetization in the free layer and the pinned layer. A GMR sensor is the most resistive when the two layers are magnetized in anti-parallel directions, and is the most conductive when they are parallel. Most companies have completed the transition from making AMR heads to making GMR heads. The technology can possibly work for areal densities up to 100 G bit/inch$^2$, beyond which point the sensitivity again becomes an issue.

One possible solution is to use TMR junctions, which can give two to three times more signal. In addition, TMR junctions offer more room for engineering design, as the TMR effect is less sensitive to the structure of the element than GMR. In particular, the magnetoresistance is usually not related to the junction area, junction resistance, and film thickness. TMR read heads have been disclosed, for example, in the following United States Patents which are herein incorporated by reference in their entirety: U.S. Pat. No. 5,390,061 assigned to Hitachi, Ltd; U.S. Pat. Nos. 5,729,410, 5,898,547, 5,898,548, and 5,901,018 all assigned to IBM.

A TMR junction is very similar to a spin valve in the sense that it also consists of a free layer, a spacer, and a pinned layer. The magnetoresistance rises from the angular difference between the magnetization in the two magnetic layers in a way entirely analogous to a spin valve. A major difference between a TMR junction and a spin valve is that the spacer in a TMR junction is made of an insulator, typically aluminum oxide, instead of a conductor. Moreover, in conventional TMR sensors the electrical current is perpendicular to the plane of the films as opposed to in the plane for GMR sensors. Consequently, one must attach a top and a bottom electrode to the junction stack in order to measure the electrical property.

Spin dependent tunneling effect has been proposed for higher areal density recording above 40 Gbit/inch$^2$. The high TMR ratio of the junctions offers much better sensitivity in the transducer as discussed above. To achieve higher areal density, it is essential to use a smaller shield-to-shield spacing. A 10 Gbit/inch$^2$ head requires about 1200 Å shield-to-shield spacing. For a 40 Gbit/inch$^2$ head, this value becomes less than 900 Å. Assuming an optimistic gap thickness of 600 Å, this means the TMR stack has to be less than 300 Å thick. This can be unrealistic for both GMR stacks and conventional TMR stacks due to the minimum thicknesses of the pinning layer (>25 nm for NiMn). In the case of TMR, the situation can be worse due to the fact that contact pads of more than 10 nm of metal film may be required to guarantee uniform current distribution within the junction, thus making a TMR stack thicker than an equivalent GMR stack.

SUMMARY OF THE INVENTION

A spin tunnel junction magnetoresistive head in accordance with the invention includes a pinned ferromagnetic layer, a free ferromagnetic layer and a spin tunnel barrier material positioned relative to the pinned and free ferromagnetic layers such that current flowing through the free ferromagnetic layer is in the plane of the free ferromagnetic layer. The spin tunnel barrier material forms first and second edge junctions. Using the edge junctions, the free ferromagnetic material, the pinned ferromagnetic and the edge junctions can all be formed at least partially in plane with each other, reducing shield-to-shield spacing for the head.

BRIEF DESCRIPTION OF THE DRAWINGS

FIGS. 5A–5C are diagrammatic illustrations of steps for fabricating a TMR sensor in accordance with third embodiments of the present invention.

DETAILED DESCRIPTION OF THE ILLUSTRATIVE EMBODIMENTS

Figure 1:
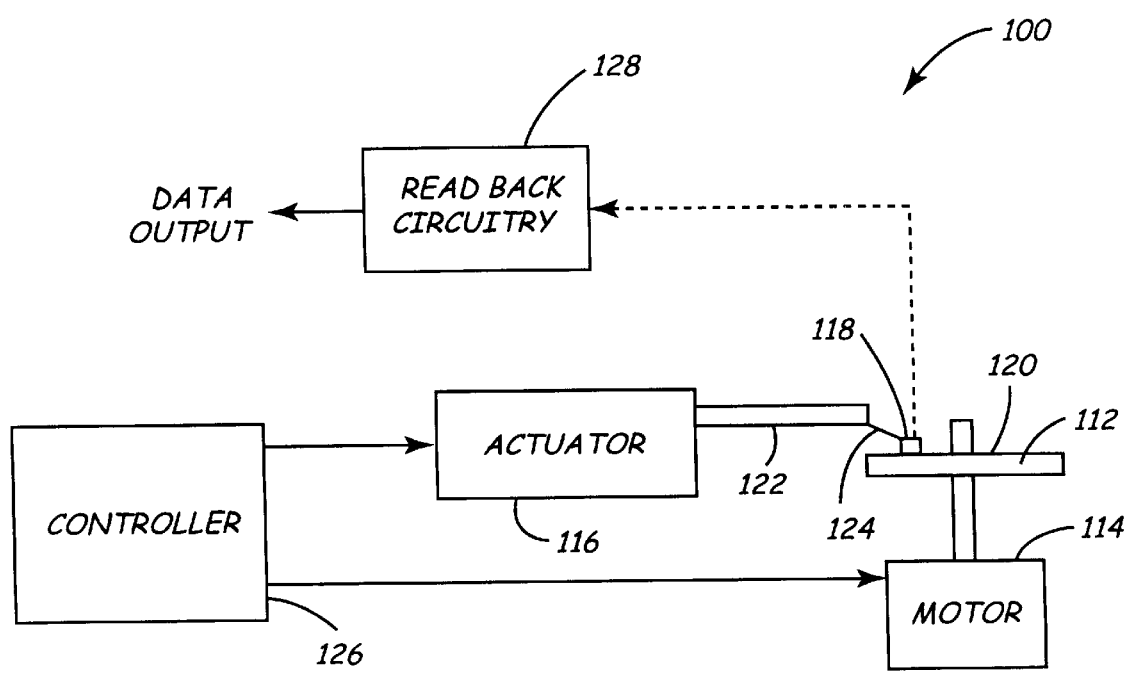
FIG. 1 is a simplified diagram of a storage system using a spin valve sensor in accordance with the present invention.

The present invention includes new TMR sensors which may be used in a data storage system such as data storage system 100 shown in FIG. 1, as well as methods of fabricating the TMR sensors. System 100 includes storage medium 112 such as a magnetic disc, which is rotated by motor 114. An actuator 116 is coupled to a slider 118 which is used to position a TMR sensor (not shown in FIG. 1) over a surface 120 of disc 112. Actuator 116 includes actuator arm 122, which is attached to slider 118 via suspension 124. A controller 126 controls positioning of slider 118. The TMR sensor operates by receiving a sense (or bias) current I from a current source on read back circuitry 128. Variations in a magnetic field applied to the sensor due to magnetization of disc 112 cause a change in the electrical resistance of the sensor. This change in electrical resistance is detected with readback circuitry 128 which responsively provides data output. FIGS. 3, 4C, 5C and 6 illustrate TMR sensors of the present invention which can be used as the TMR sensor in system 100. Other TMR sensors in accordance with the present invention can be used as well.

Figure 2:
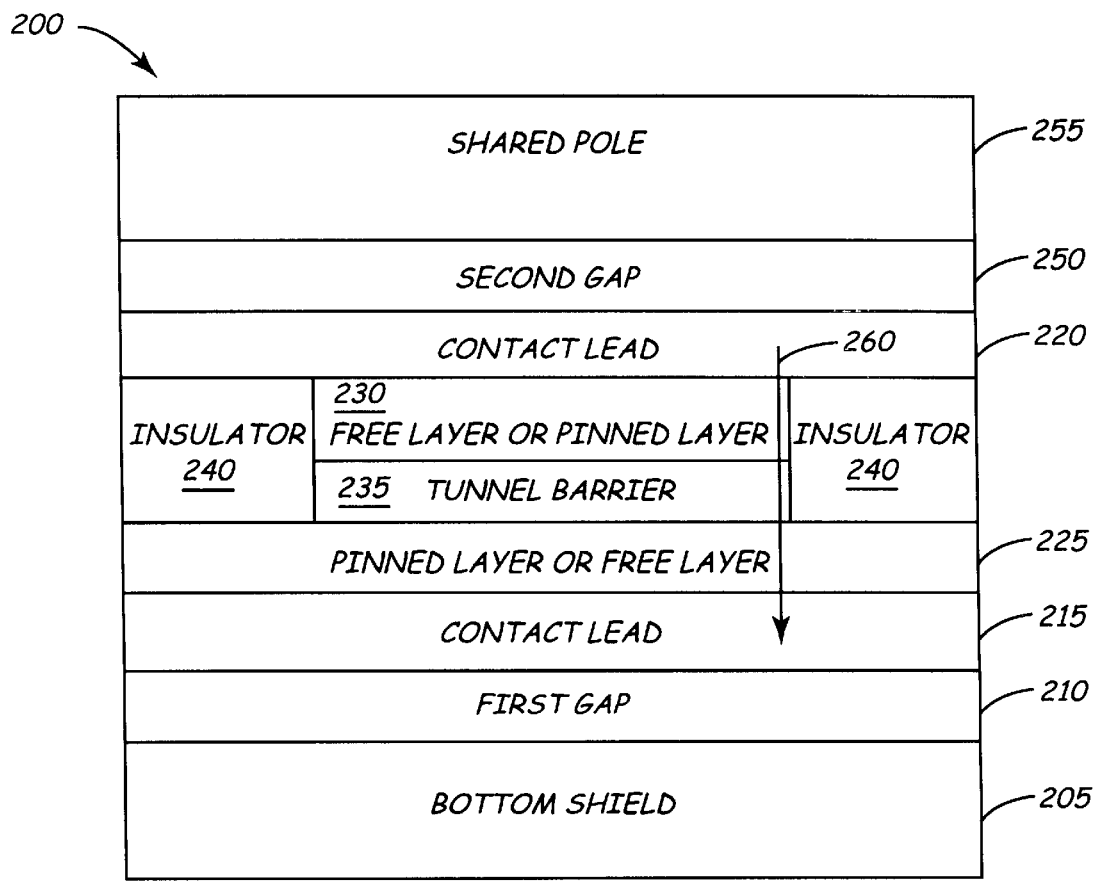
FIG. 2 is a diagrammatic illustration of a prior art TMR sensor.

FIG. 2 is a diagrammatic illustration of a prior art TMR sensor 200 which can be used in magnetic read heads. Fabrication of sensor 200 involves several deposition, etching, and photo processes. Typically, an insulator layer (not shown) is deposited on a ceramic substrate (not shown) and then polished. A bottom magnetic shield 205 is deposited and shaped, followed with deposition of a thin insulator layer 210 called the first gap.

Then, a series of depositions, etching, milling and lift-off processes are performed to fabricate the active sensor. The active portion of the sensor generally includes contact leads 215 and 220, the pinned ferromagnetic layer 225, the free ferromagnetic layer 230, the tunnel barrier 235 of insulating material positioned between pinned layer 225 and free layer 230, and insulators 240 surrounding the tunnel barrier. It should be noted that while layers 225 and 230 are described as the pinned and free layers, respectively, these layers can be reversed if desired such that layer 225 is the free layer and layer 230 is the pinned layer. The sensor structure is then covered with an insulator layer 250 called a second gap, which is followed by the deposition of a second shield 255, also referred to as the shared pole. The writer structure can be built over the second shield.

The current in prior art TMR sensor 200 flows in the vertical direction between contact leads 215 and 220, perpendicular to the planes in which the pinned layer and the free layer are longitudinally formed. Thus, prior art sensor 200 is a current-perpendicular-to-plane (CPP) sensor. The shield-to-shield spacing (the spacing between bottom shield 205 and top shield or shared pole 255) must accommodate the pinning layer, the pinned layer, the free layer and the contact pads. As discussed above, this structure may have too high of a shield-to-shield spacing to achieve the high areal densities desired.

Figure 3:
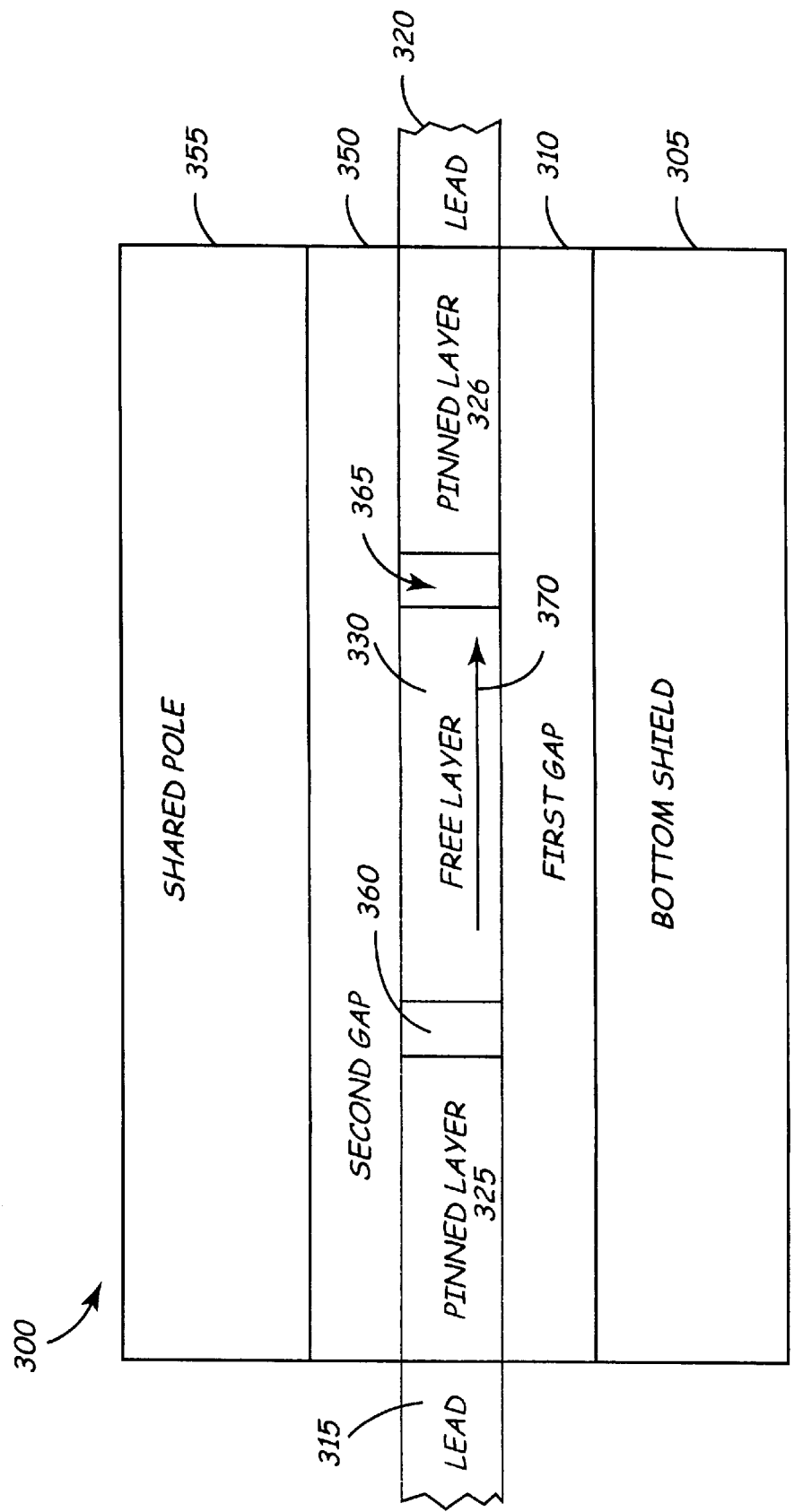
FIG. 3 is a diagrammatic illustration of a TMR sensor in accordance with first embodiments of the present invention.

FIG. 3 is a diagrammatic illustration of a portion of TMR sensor 300 in accordance with first embodiments of the present invention. TMR sensor 300 includes bottom shield 305, first gap 310, electrical leads 315 and 320, pinned ferromagnetic layer portions 325 and 326, free ferromagnetic layer portion 330 between pinned layer portions 325 and 326, second gap 350, shared pole or top shield 355, and edge junctions 360 and 365. Instead of being built vertically, the sensor region between the first and second gaps is formed at least partially in the same planes. Thus, pinned layer regions 325 and 326 can be formed completely or partially in the same planes as free layer 330. By replacing the tunnel barrier layer of the prior art TMR sensor with edge junctions 360 and 365 each formed at least partially in these planes between one of the pinned layer sections and the free layer, the shield-to-shield spacing of TMR sensor 300 can be greatly reduced as compared to the prior art. Current flows from left to right (or from right to left) from lead 315, through pinned layer sections 325 and 326, edge junctions 360 and 365, and free layer 330 in the direction of arrow 370. Thus, with no contact pads necessary on the top or bottom as in the prior art TMR sensor, additional shield-to-shield spacing reduction can be achieved. TMR sensor 300 can thus be described as a current-in-plane (CIP) TMR sensor, while prior art sensor 200 illustrated in FIG. 2 is a CPP TMR sensor.

Figure 4A:
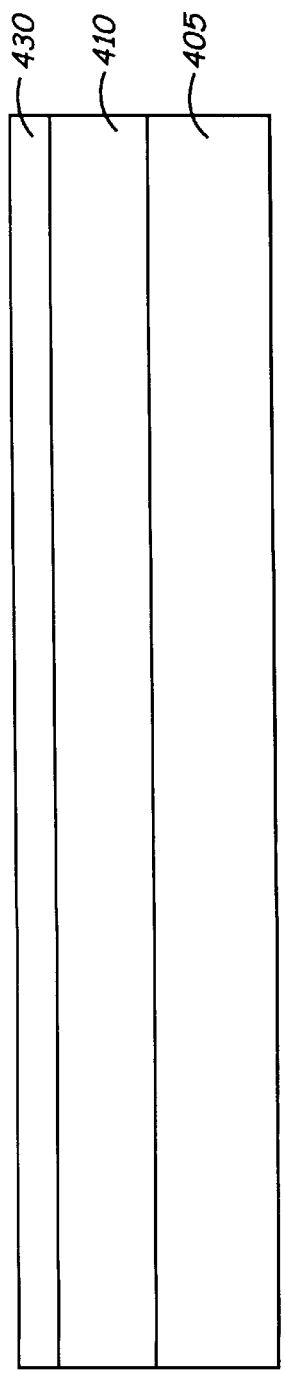
FIGS. 4A–4C are diagrammatic illustrations of steps for fabricating a TMR sensor in accordance with second embodiments of the present invention.
Figure 4B:
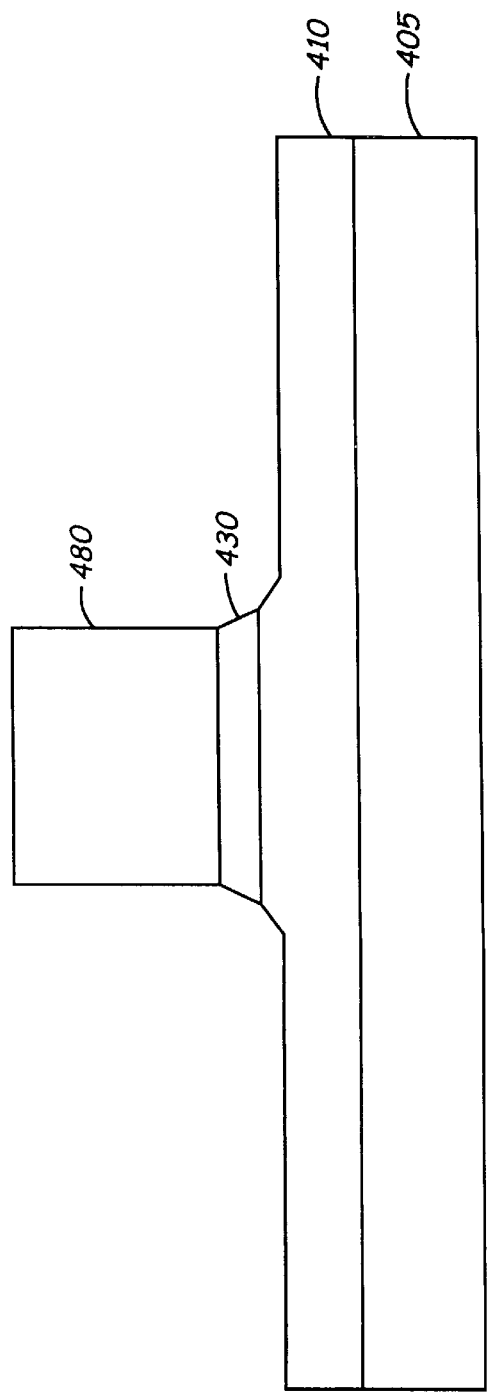
Figure 4C:
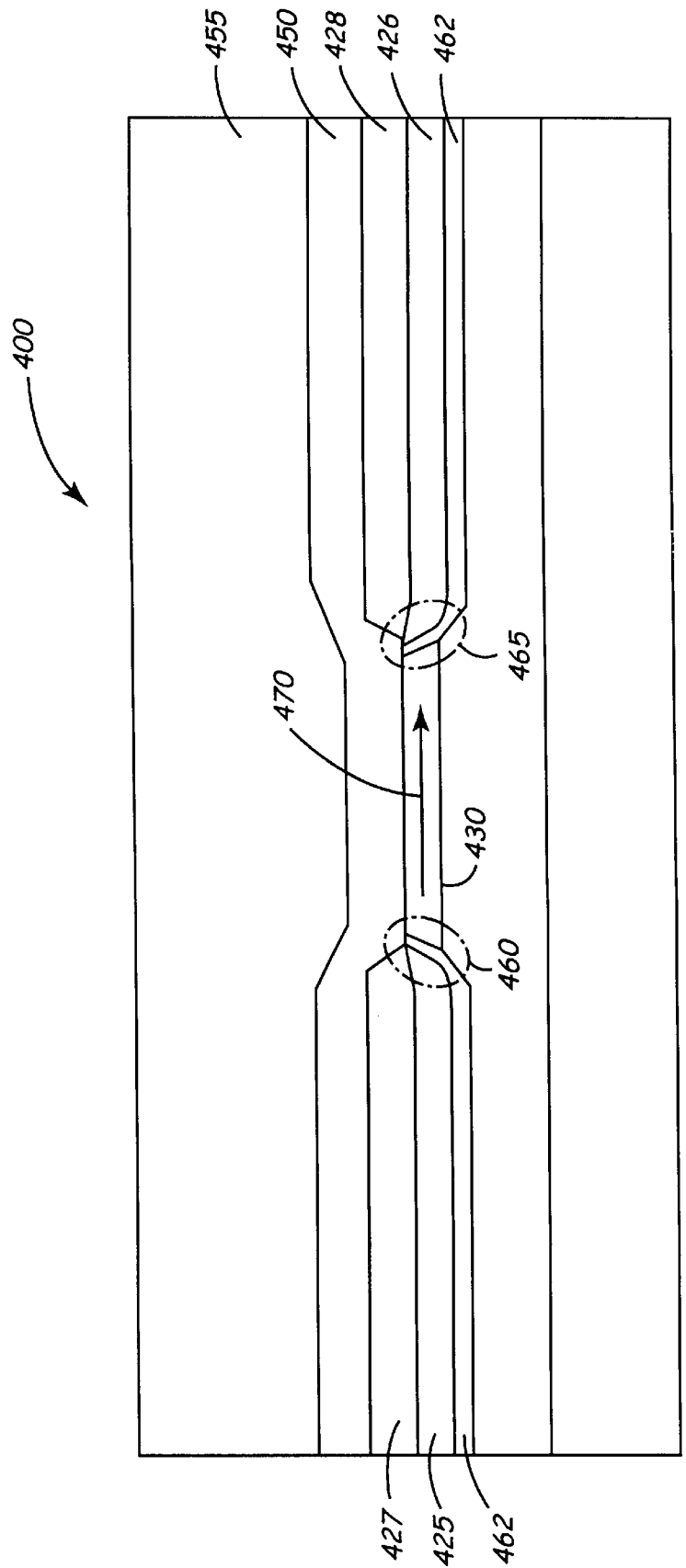
Figure 5C:
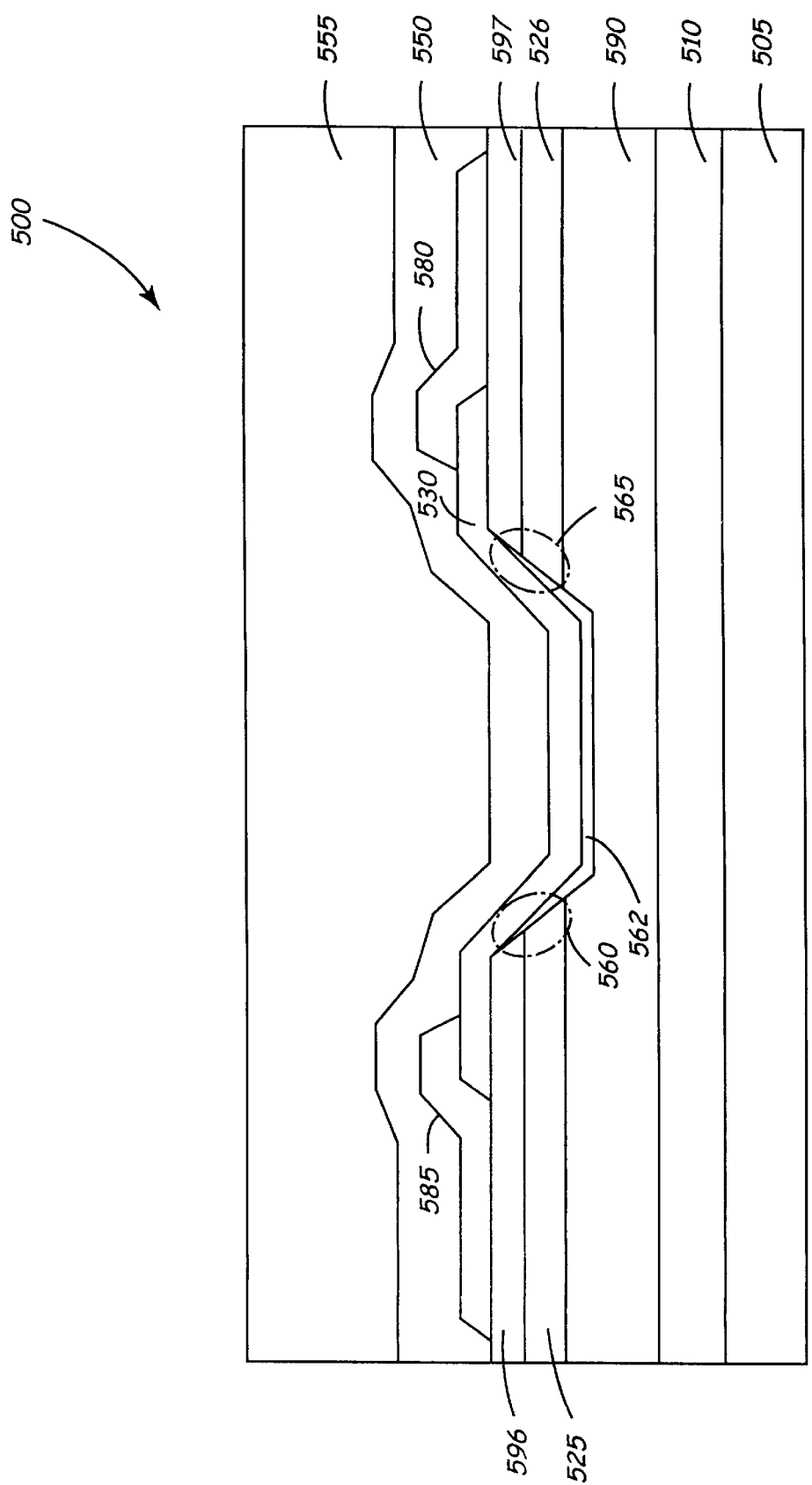

The TMR sensors of the present invention can be formed in numerous different embodiments, two of which are illustrated In FIGS. 4C and 5C. FIGS. 4A–4C and 5A–5C illustrate steps in the methods of fabricating these TMR sensors.

The fabrication process illustrated in FIGS. 4A–4C is a self-align process and uses permanent magnet horizontal bias. It uses a single photolithography step to define all essential dimensions. The process begins, as illustrated in FIG. 4A, by depositing sheet films for the free ferromagnetic layer. In the illustrated embodiment, this includes depositing the bottom shield 405, the first gap 410 and the free ferromagnetic layer 430.

Next, as illustrated in FIG. 4B, this film stack is patterned (using photoresist 480 placed on the central region of free layer 430) and milled into the first gap 410. Thus, free layer 430 is completely removed except for portions under or adjacent the photoresist, and portions of first gap 410 are removed.

With the same photoresist 480 in place, tunnel barrier 462 is deposited on top of first gap 410. The tunnel barrier material is, in same embodiments, aluminum oxide ($AlO_x$) having a thickness of approximately 20 Å. Also with the photoresist in place, the pinned layer (forming pinned layer portions 425 and 426) and permanent magnet layer (forming permanent magnets 427 and 428 are deposited. A lift off of photoresist 480 removes the portions of the deposited layers on top of the photoresist. With portions of tunnel barrier 462 adjacent free layer 430 tapering upward from the planes in which the remainder of the tunnel barrier is formed, tunnel junctions 460 and 465 (circled in FIG. 4C) are formed at least partially in plane with and adjacent to free layer 430. The design is then completed by depositing the second gap 450 and shared pole 455. Of course, not shown in these illustrated steps is the deposition of electrical leads, for example outside of and at least partially in plane with pinned layer portions 425 and 426 as is shown in FIG. 3. These steps are omitted in the drawing to simplify the illustrations, and will be readily implemented by those of skill in the art.

The final TMR sensor 400 (minus leads and potentially other optional components) is illustrated in FIG. 4C. As can be seen, the reader width is the same as the length of the free layer 430 between spin tunnel junctions 460 and 465. Current will flow in plane through the free layer between the junctions (generally in the direction of arrow 470). As discussed above, this design provides significant reduction in shield-to-shield spacing.

The TMR sensor 500 illustrated in FIG. 5C is fabricated using the process shown in FIGS. 5A–5C, and utilizes a pinning material, for example NiO or a Mn-based alloy, and exchange tab biasing. As shown in FIG. 5A, the process for fabricating this sensor begins with deposition of sheet films of the pinning structure. Bottom shield 505, first gap 510, pinning layer 590, pinned ferromagnetic layer 524 and insulator 595 are sequentially deposited. In an exemplary embodiment, the insulator is a layer of $Al_2O_3$ having a thickness of approximately 300 Å.

The next steps define the junction with photolithography and ion milling as illustrated in FIG. 5B. Photoresist 580 is patterned on top of outer regions 596 and 597 of insulator 595. The center region of the stack is then milled to remove the middle portion of layers 595 and 524, but the mill stops inside pinning layer 590 (which should be an insulating antiferromagnet such as NiO, NiFeO, or $Fe_2O_3$). Removal of portions of layers 595 and 524 leaves insulator layer segments 596 and 597 and pinned layer segments 525 and 526. Leaving the photoresist in place, about 20 Å of aluminum are deposited and the film is oxidized to form an $AlO_x$ tunneling barrier 562 which provides the tunnel junctions 560 and 565. To protect the barrier, a thin layer of NiFe can be deposited before lifting off the photoresist.

Two more photolithography steps of the type known in the art are used to deposit and define the free layer 530 on top of tunneling barrier 562 (including on top of junctions 560 and 565) and on top of portions of insulator layer segments 596 and 597, and to deposit and define antiferromagnetic exchange tabs 580 and 585 on the outer most portions of free layer 530. The exchange tabs can be, for example, NiMn or other antiferromagnetic materials. Note that the reader width is defined by the edges of the exchange tabs, not by junctions 560 and 565. Finally, second gap 550 and shared pole 555 are formed as shown. In both sensor 400 illustrated in FIG. 4C and in sensor 500 illustrated in FIG. 5C, the shape of the free ferromagnetic layer can be used to further stabilize the sensor.

Figure 6:
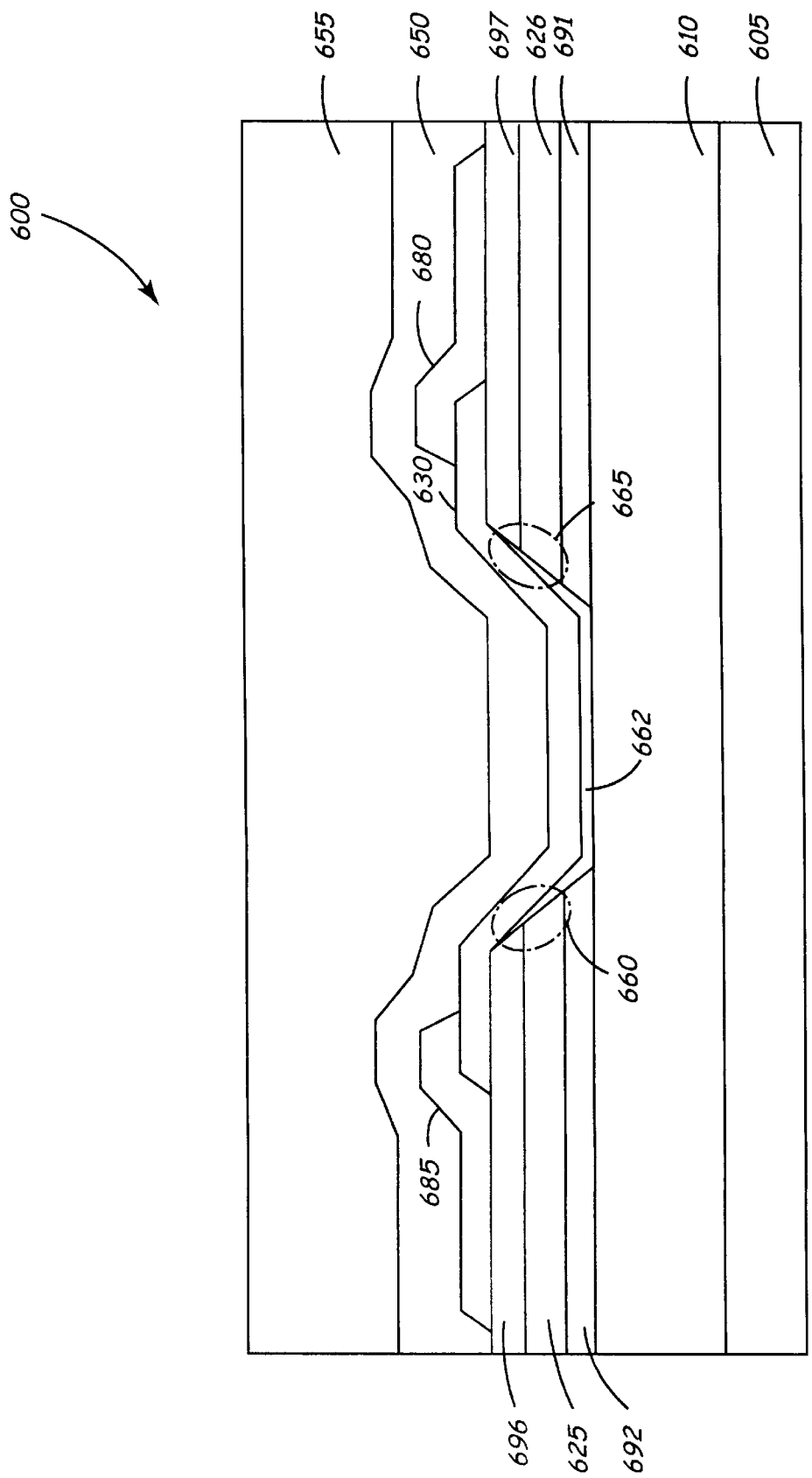
FIG. 6 is a diagrammatic illustration of a TMR sensor in accordance with fourth embodiments of the present invention.

The TMR sensor 600 illustrated in FIG. 6 is similar to TMR sensor 500 and is fabricated using a similar process. TMR sensor 600 includes bottom shield 605, first gap 610, pinning layer regions 691 and 692, pinned ferromagnetic layer regions 625 and 626, 624, insulator regions 696 and 697, tunneling barrier 662 which provides the tunnel junctions 660 and 665, free layer 630, antiferromagnetic exchange tabs 680 and 685, second gap 650 and shared pole 655, which are similar to the equivalently numbered layers shown in FIG. 5C. TMR sensor 600 differs from TMR sensor 500 in that the center portion of the stack is milled deeper to separate the pinning layer into separate regions 691 and 692. The pinning layer can be a Mn-based alloy such as NiMn, IrMn, or PtMn which exhibit high blocking temperatures.

A potential problem in the above-described processes is that there is photoresist present during the formation of the tunnel barrier. The out-gasing form the photoresist can pollute the barrier material and degrade the barrier quality. To remedy this potential problem, a hard mask (e.g., $Si_3N_4$) can be used as a replacement for, or in addition to, the photoresist. Therefore, in the above discussions and in the associated drawings, references to photoresist are intended to include hard masks embodiments.

Although the present invention has been described with reference to preferred embodiments, workers skilled in the art will recognize that changes may be made in form and detail without departing from the spirit and scope of the invention.

What is claimed is:

1. A storage system for storing information, comprising:
    a magnetic storage medium; and
    current-in-plane spin tunnel junction sensor means for reading information from the magnetic storage medium.

2. A spin tunnel junction magnetoresistive head comprising:
    a pinned ferromagnetic layer;
    a free ferromagnetic layer; and
    spin tunnel barrier material positioned relative to the pinned and free ferromagnetic layers such that current flowing through the free ferromagnetic layer and the spin tunnel barrel material is in a plane of and generally parallel to the free ferromagnetic layer and the pinned ferromagnetic layer.

3. The spin tunnel function magnetoresistive head of claim 2, and further comprising first and second edge junctions formed in the spin tunnel barrier material.

4. The spin tunnel junction magnetoresistive head of claim 3, wherein each of the first and second edge junctions is formed at least partially in plane with the free ferromagnetic layer.

5. The spin tunnel junction magnetoresistive head of claim 4, wherein the pinned ferromagnetic layer is formed at least partially in plane with the free ferromagnetic layer.

6. The spin tunnel junction magnetoresistive head of claim 5, wherein each of the first and second edge junctions are positioned between the free ferromagnetic layer and different sections of the pinned ferromagnetic layer.

7. The spin tunnel junction magnetoresistive head of claim 6, and further comprising a first gap layer and a second gap layer positioned such that the pinned ferromagnetic layer, the free ferromagnetic layer and the spin tunnel barrier material are all positioned in between the first and second gap layers.

8. The spin tunnel junction magnetoresistive head of claim 7, and further comprising antiferromagnetic exchange tabs positioned adjacent outer regions of the free ferromagnetic: layer for biasing the free ferromagnetic layer.

9. The spin tunnel junction magnetoresistive head of claim 7, and further comprising a pinning layer material positioned adjacent the pinned ferromagnetic layer for pinning the pinned ferromagnetic layer.

10. The spin tunnel junction magnetoresistive head of claim 9, wherein the pinning layer material comprises an oxide antiferromagnet.

11. The spin tunnel junction magnetoresistive head of claim 9, wherein the pinning layer material comprises a Mn alloy material.

12. The spin tunnel junction magnetoresistive head of claim 11, wherein the pinning layer material comprises NiMn.

13. The spin tunnel junction magnetoresistive head of claim 11, wherein the pinning layer material comprises IrMn.

14. The spin tunnel junction magnetoresistive head of claim 11, wherein the pinning layer material comprises PtMn.

15. A method of fabricating a spin tunnel junction magnetoresistive head, the method comprising:
    forming a free ferromagnetic layer;
    forming a pinned ferromagnetic layer; and
    forming spin tunnel barrier material such that edge junctions of the spin tunnel barrier material separate the free ferromagnetic layer and the pinned ferromagnetic layer, such that the edge junctions are at least partially in plane with each of the free ferromagnetic layer and the pinned ferromagnetic layer, and such that current flowing between the free ferromagnetic layer and the pinned ferromagnetic layer through the edge junctions flows generally parallel to and in plane with the free and pinned ferromagnetic layers.

16. The method of claim 15, wherein the spin tunnel material is formed after the free ferromagnetic layer is formed and before the pinned ferromagnetic layer is formed.

17. The method of claim 15, wherein the spin tunnel material is formed after the pinned ferromagnetic layer is formed and before the free ferromagnetic layer is formed.

18. The method of claim 15, and further comprising patterning one of the free and pinned ferromagnetic layers with a hard mask and removing portions of the one of the free and pinned ferromagnetic layers prior to forming the spin tunnel barrier material.

19. The method of claim 18, wherein the hard mask comprises $Si_3N_4$.

* * * * *

UNITED STATES PATENT AND TRADEMARK OFFICE
CERTIFICATE OF CORRECTION

PATENT NO. : 6,411,478 B1
DATED : June 25, 2002
INVENTOR(S) : Sining Mao et al.

It is certified that error appears in the above-identified patent and that said Letters Patent is hereby corrected as shown below:

Title page,
Item [54], delete "SPIN TUNNEL JUNCTION RECORDING HEADS USING AN EDGE JUNCTION STRUCTURE WITH CIP" and replace with -- SPIN TUNNEL JUNCTION RECORDING HEADS USING AN EDGE JUNCTION STRUCTURE --.

Column 1,
Line 3, after "STRUCTURE", delete "WITH CIP".

Column 6,
Line 13, before "layer for biasing the free ferromagnetic layer", delete ":".

Signed and Sealed this

Twelfth Day of November, 2002

JAMES E. ROGAN
Director of the United States Patent and Trademark Office

*Attest:*

*Attesting Officer*